(12) United States Patent
Sasaki et al.

(10) Patent No.: US 10,647,094 B2
(45) Date of Patent: May 12, 2020

(54) THERMALLY CONDUCTIVE COMPOSITE MATERIAL (71) Applicant: TOYOTA JIDOSHA KABUSHIKI KAISHA, Toyota-shi, Aichi-ken (JP)

(72) Inventors: Megumi Sasaki, Nagakute (JP); Hiromitsu Tanaka, Nagakute (JP); Shinichi Miura, Toyota (JP); Masataka Deguchi, Nagoya (JP); Masaki Terada, Toyota (JP); Tetsuyoshi Fukaya, Toukai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 142 days.

(21) Appl. No.: 15/926,140

(22) Filed: Mar. 20, 2018

(65) Prior Publication Data
US 2018/0272674 A1 Sep. 27, 2018

(30) Foreign Application Priority Data
Mar. 24, 2017 (JP) .................... 2017-058654

(51) Int. Cl.
*B32B 27/20* (2006.01)
*B32B 27/38* (2006.01)
(Continued)

(52) U.S. Cl.
CPC ............ *B32B 27/20* (2013.01); *B32B 27/38* (2013.01); *C08K 3/38* (2013.01); *C08L 63/00* (2013.01); *B32B 2305/026* (2013.01); *B32B 2305/30* (2013.01); *B32B 2307/302* (2013.01); *C08K 3/013* (2018.01); *C08K 2003/282* (2013.01); *C08K 2003/385* (2013.01); *C08K 2201/005* (2013.01)

(58) Field of Classification Search
None
See application file for complete search history.

(56) References Cited

U.S. PATENT DOCUMENTS

2015/0037575 A1  2/2015  Sakaguchi et al.

FOREIGN PATENT DOCUMENTS

CN  104220533 A   12/2014
JP  2002-121393 A  4/2002
(Continued)

OTHER PUBLICATIONS

Hyozu et al., Thermally Conductive Resin Composition, Apr. 23, 2002, machine translation of JP2002-121393 (Year: 2002).*

*Primary Examiner* — Chinessa T. Golden
(74) *Attorney, Agent, or Firm* — Sughrue Mion, PLLC (57) ABSTRACT

There is provided a thermally conductive composite material obtained by dispersing a thermally conductive filler in a matrix. The thermally conductive filler is a mixture including boron nitride particles with an average particle size of 10 μm to 100 μm and aluminum nitride particles with an average particle size that is 1/100 to 1/2 of the average particle size of the boron nitride particles, a content of the boron nitride particles is 60 volume % to 90 volume % with respect to a total amount of the boron nitride particles and the aluminum nitride particles, a content of the thermally conductive filler is 80 volume % to 95 volume % with respect to a total amount of the composite material, and a porosity of the composite material is 10 volume % or less.

6 Claims, 5 Drawing Sheets

(51) Int. Cl.
  *C08L 63/00*   (2006.01)
  *C08K 3/38*    (2006.01)
  *C08K 3/013*   (2018.01)
  *C08K 3/28*    (2006.01)

(56) References Cited

FOREIGN PATENT DOCUMENTS

| | | | |
|---|---|---|---|
| JP | 2002121393 A | * | 4/2002 |
| JP | 2010-260225 A | | 11/2010 |
| JP | 2011-184507 A | | 9/2011 |
| JP | 2012-201106 A | | 10/2012 |
| JP | 2016-191030 A | | 11/2016 |
| WO | 2013/145961 A1 | | 10/2013 |

* cited by examiner

THERMALLY CONDUCTIVE COMPOSITE MATERIAL

INCORPORATION BY REFERENCE

The disclosure of Japanese Patent Application No. 2017-058654 filed on Mar. 24, 2017 including the specification, drawings and abstract is incorporated herein by reference in its entirety.

BACKGROUND

1. Technical Field

The present disclosure relates to a thermally conductive composite material obtained by dispersing a thermally conductive filler in a matrix.

2. Description of Related Art

Boron nitride is known as a highly insulating material with high thermal conductivity, and various thermally conductive composite materials in which boron nitride particles are dispersed as a thermally conductive filler in a matrix have been developed. For example, in Japanese Unexamined Patent Application Publication No. 2010-260225 (JP 2010-260225 A), a thermally conductive molded body obtained by cutting a silicone laminate including two types of boron nitride powder with different average particle sizes as a thermally conductive filler in a lamination direction is disclosed.

In addition, thermally conductive composite materials obtained by combining other thermally conductive material particles including alumina, aluminum nitride, silicon oxide, silicon nitride, diamond, graphite, or the like and boron nitride particles have been developed. For example, Japanese Unexamined Patent Application Publication No. 2011-184507 (JP 2011-184507 A) discloses a resin composition including a highly thermally conductive filler that includes (A) alumina with an average particle size of 30 μm to 49 μm and an average sphericity of 0.85 or more, (B) boron nitride with an average particle size of 2 μm to 8 μm, a graphitization index of 2.0 to 7.0, and a peak intensity ratio I(002)/I(001) between the (002) plane and the (100) plane in powder X-ray diffraction that is 6 to 18, and (C) aluminum nitride with an average particle size of 0.1 μm to 3 μm, and wherein a ratio of (A)/(B) is 80/20 to 70/30 by volume ratio, and a ratio (A+B)/(C) between a total volume (A+B) of (A)+(B) and (C) is 95/5 to 75/25 by volume ratio.

In addition, Japanese Unexamined Patent Application Publication No. 2012-201106 (JP 2012-201106 A) discloses (i) a thermally conductive molded body obtained by cutting a silicone laminate in which silicone resin composites which include 40 volume % to 70 volume % of a thermally conductive filler including hexagonal boron nitride powder (A) with an average particle size of 20 μm to 50 μm and aluminum oxide powder (B) with an average particle size of 0.5 μm to 5 μm, and with a mixing ratio of (A):(B) that is 7:3 to 9:1 by volume ratio are laminated in a lamination direction, and (ii) a thermally conductive molded body obtained by cutting a silicone laminate in which silicone resin composites which include 40 volume % to 70 volume % of a thermally conductive filler including hexagonal boron nitride powder (A) with an average particle size of 20 μm to 50 μm and aluminum nitride powder (B) with an average particle size of 0.5 μm to 5 μm, and with a mixing ratio of (A):(B) that is 7:3 to 9:1 by volume ratio are laminated in a lamination direction.

However, in such thermally conductive composite materials of the related art, there is a limit to improving thermal conductivity, and sufficient thermal conductivity cannot be necessarily obtained.

SUMMARY

The present disclosure provides a thermally conductive composite material having excellent thermal conductivity.

The inventors have conducted extensive studies to achieve the above object and as a result, found that, when boron nitride particles and aluminum nitride particles which have a specific average particle size are used as a thermally conductive filler, these are dispersed at a specific mixing ratio in a matrix such that a higher specific filler filling ratio than in the related art is obtained, and the porosity of the obtained composite material is lower than a specific porosity, surprisingly, a composite material having higher thermal conductivity compared to when these are used alone is obtained due to a synergistic effect between the boron nitride particles and the aluminum nitride particles, and completed the present disclosure.

An aspect of the present disclosure relates to a thermally conductive composite material including a matrix and a thermally conductive filler in the matrix. The thermally conductive filler is a mixture including boron nitride particles with an average particle size of 10 μm to 100 μm and aluminum nitride particles with an average particle size that is 1/100 to 1/2 of the average particle size of the boron nitride particles. A content of the boron nitride particles is 60 volume % to 90 volume % with respect to a total amount of the boron nitride particles and the aluminum nitride particles. A content of the thermally conductive filler is 80 volume % to 95 volume % with respect to a total amount of the composite material. A porosity of the composite material is 10 volume % or less.

The content of the boron nitride particles may be 70 volume % to 90 volume % with respect to the total amount of the boron nitride particles and the aluminum nitride particles. The content of the thermally conductive filler may be 85 volume % to 95 volume % with respect to the total amount of the composite material.

The boron nitride particles may be plate-shaped hexagonal boron nitride particles.

Here, the reason why the thermally conductive composite material of the present disclosure has excellent thermal conductivity is not clearly understood. The inventors speculate that the reason is as follows. That is, first, while aluminum nitride particles initially have higher thermal conductivity than boron nitride particles, when an amount of aluminum nitride particles added increases, the porosity increases, interfacial contact between particles deteriorates, and an interface resistance increases and contrarily thermal conductivity decreases. Thus, in the related art, even if aluminum nitride particles are added, it is not possible to obtain a composite material having sufficiently high thermal conductivity. On the other hand, in the thermally conductive composite material of the present disclosure, when boron nitride particles with a specific average particle size and aluminum nitride particles with a smaller specific average particle size than boron nitride particles are used as a thermally conductive filler, and these are dispersed at a specific mixing ratio in a matrix such that a higher specific filler filling ratio than in the related art is obtained, boron nitride particles having relative flexibility are densely filled into the composite material in an overlapping manner, and it is possible to lower the porosity of the composite material obtained at a very high filler filling ratio to one below a specific porosity, that would not be conceivable for a general filler-containing composite material. Thus, in such a composite material, aluminum nitride particles are contained in boron nitride particles in a range in which the boron nitride particles can be deformed, and a tightly-adhered interface due to flexibility of the boron nitride particles is formed between the aluminum nitride particles and the boron nitride particles. The inventors infer as follows. An interface between the aluminum nitride particles and the boron nitride particles has an interface resistance with a much lower thermal resistance than an interface between aluminum nitride particles. Therefore, in the thermally conductive composite material of the present disclosure, according to such a low interface resistance between the aluminum nitride particles and the boron nitride particles, and high thermal conductivity that the aluminum nitride particles initially have, surprisingly, a composite material having higher thermal conductivity compared to when these are used alone is obtained due to a synergistic effect between the boron nitride particles and the aluminum nitride particles.

According to the present disclosure, it is possible to provide a thermally conductive composite material having excellent thermal conductivity.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Exemplary embodiments of a thermally conductive composite material of the present disclosure will be described below in detail.

A thermally conductive composite material according to an embodiment of the present disclosure is a thermally conductive composite material obtained by dispersing a thermally conductive filler in a matrix. The thermally conductive filler is a mixture including boron nitride particles with an average particle size of 10 μm to 100 μm and aluminum nitride particles with an average particle size that is 1/100 to 1/2 of the average particle size of the boron nitride particles. A content of the boron nitride particles is 60 volume % to 90 volume % with respect to a total amount of the boron nitride particles and the aluminum nitride particles. A content of the thermally conductive filler is 80 volume % to 95 volume % with respect to a total amount of the composite material. A porosity of the composite material is 10 volume % or less.

In the embodiment of the present disclosure, as the thermally conductive filler, a mixture in which boron nitride (BN) particles and aluminum nitride (AlN) particles are combined is used. When such boron nitride particles and aluminum nitride particles are dispersed in a matrix so that specific conditions which will be described below in detail are satisfied, it is possible to obtain a composite material having higher thermal conductivity due to a synergistic effect thereof compared to when these particles are used alone.

Boron nitride of boron nitride particles used in the embodiment of the present disclosure includes that having a hexagonal normal pressure phase, a cubic high pressure phase, and the like. However, plate-shaped hexagonal boron nitride particles are preferable because they are densely filled into a matrix and a thermal resistance thereof at an interface with aluminum nitride particles tends to be smaller.

It is necessary for the boron nitride particles used in the embodiment of the present disclosure to have an average particle size of 10 μm to 100 μm. When boron nitride particles having a relatively large average particle size in this manner are used, even if a content of filler in a composite material obtained as will be described below increases, it is possible to sufficiently reduce the porosity. As a result, the thermal conductivity can be improved according to a synergistic effect between the boron nitride particles and the aluminum nitride particles. When the average particle size of the boron nitride particles is less than 10 μm, it is not possible to sufficiently reduce the porosity when a content of filler in the obtained composite material increases. As a result, it is not possible to improve thermal conductivity due to a synergistic effect between the boron nitride particles and the aluminum nitride particles. On the other hand, when the average particle size of the boron nitride particles exceeds 100 μm, dispersion uniformity and a filling ratio of the thermally conductive filler in the obtained composite material decrease and thermal conductivity is lowered. In addition, in consideration of the fact that thermal conductivity thereby tends to be further improved due to a synergistic effect between the boron nitride particles and the aluminum nitride particles, the average particle size of the boron nitride particles is more preferably 10 μm to 50 μm and particularly preferably 10 μm to 30 μm.

In addition, it is necessary for the aluminum nitride particles used in the embodiment of the present disclosure to have an average particle size that is 1/100 to 1/2 of an average particle size of the boron nitride particles used in combination therewith. When aluminum nitride particles smaller than the boron nitride particles used in combination therewith are used in this manner, the aluminum nitride particles coincide with and fit into small voids between the boron nitride particles, and the high thermal conductivity that the aluminum nitride particles initially have is effectively exhibited. As a result, the thermal conductivity can be improved according to a synergistic effect between the boron nitride particles and the aluminum nitride particles. When the average particle size of the aluminum nitride particles is less than 1/100 of the average particle size of the boron nitride particles used in combination therewith, since grain boundary resistance between the boron nitride particles and the aluminum nitride particles and between the aluminum nitride particles and the number of grain boundaries in the composite material increase, the thermal conductivity decreases. On the other hand, when the average particle size of the aluminum nitride particles exceeds 1/2 of the average particle size of the boron nitride particles used in combination therewith, there is peeling off at an interface between boron nitride particles, and a thermally favorable interface between the boron nitride particles with a low interface resistance is disrupted, an interface at which aluminum nitride particles are adjacent is enlarged, and a larger interface resistance is generated due to point contact at hard surfaces of the aluminum nitride particles. As a result, improvement in thermal conductivity due to a synergistic effect between the boron nitride particles and the aluminum nitride particles is not obtained. In addition, in consideration of the fact that thermal conductivity thereby tends to be further improved due to a synergistic effect between the boron nitride particles and the aluminum nitride particles, the average particle size of the aluminum nitride particles is more preferably 1/30 to 1/2 of the average particle size of the boron nitride particles used in combination therewith and particularly preferably 1/10 to 1/2.

Here, the "average particle size" in this specification refers to a particle size (median diameter: D50) at 50% in a cumulative particle size distribution obtained by a laser diffraction and scattering method (or particle size measurement using an electronic microscope).

In addition, in the embodiment of the present disclosure, in order to further improve dispersibility in the matrix, a functional group such as a hydroxyl group, a carboxyl group, an ester group, an amide group, or an amino group may be bonded to the surface of boron nitride particles and aluminum nitride particles used as the thermally conductive filler.

The thermally conductive composite material according to the embodiment of the present disclosure is obtained by dispersing the boron nitride particles and the aluminum nitride particles in a matrix as a thermally conductive filler.

As the matrix in the thermally conductive composite material according to the embodiment of the present disclosure, preferably an insulating resin is used. Although not particularly limited, specifically, for example, a thermosetting resin such as an epoxy resin, a phenolic resin, and a silicone resin, and a thermoplastic resin such as polystyrene, polymethyl methacrylate, polycarbonate, a polyolefin (for example, polyethylene and polypropylene), a polyolefin elastomer, polyethylene terephthalate, nylon, an ABS resin, polyamide, polyimide, polyamide imide, ethylene-propylene-diene rubber (EPDM), butyl rubber, natural rubber, polyisoprene, and polyetherimide may be exemplified. Such resins may be used alone or two or more thereof may be used in combination therewith.

In the thermally conductive composite material according to the embodiment of the present disclosure, it is necessary for a content of the boron nitride particles to be 60 volume % to 90 volume % with respect to a total amount of the boron nitride particles and the aluminum nitride particles. When the boron nitride particles and the aluminum nitride particles are combined at such a mixing ratio (boron nitride particles at 60 volume % to 90 volume % and aluminum nitride particles at 40 volume % to 10 volume %) and used, the aluminum nitride particles coincide with and fit into small voids between the boron nitride particles, and the high thermal conductivity that the aluminum nitride particles initially have is effectively exhibited. As a result, the thermal conductivity can be improved due to a synergistic effect between the boron nitride particles and the aluminum nitride particles. When a content of the boron nitride particles is less than 60 volume %, there is peeling off at an interface between the boron nitride particles, and a thermally favorable interface between the boron nitride particles with a low interface resistance is disrupted, an interface at which aluminum nitride particles are adjacent is enlarged, and a larger interface resistance is generated due to point contact at hard surfaces of the aluminum nitride particles. As a result, it is not possible to improve thermal conductivity due to a synergistic effect between the boron nitride particles and the aluminum nitride particles. On the other hand, when a content of the boron nitride particles exceeds 90 volume %, effects due to adding the aluminum nitride particles are not obtained. In addition, in consideration of the fact that thermal conductivity thereby tends to be further improved due to a synergistic effect between the boron nitride particles and the aluminum nitride particles, a content of the boron nitride particles is more preferably 70 volume % to 90 volume % and particularly preferably 75 volume % to 85 volume % with respect to a total amount of the boron nitride particles and the aluminum nitride particles.

In addition, in the thermally conductive composite material according to the embodiment of the present disclosure, it is necessary for a content of the thermally conductive filler (a total content of the boron nitride particles and the aluminum nitride particles, "filler filling ratio") to be 80 volume % to 95 volume % with respect to a total amount of the composite material. In this manner, in the thermally conductive composite material according to the embodiment of the present disclosure, when a filler filling ratio higher than in the related art is set, boron nitride particles with relative flexibility are densely filled into the composite material in an overlapping manner, and the aluminum nitride particles fit into voids therebetween, and according to a low interface resistance between the aluminum nitride particles and the boron nitride particles, and high thermal conductivity that the aluminum nitride particles initially have, as a result, the thermal conductivity can be improved according to a synergistic effect between the boron nitride particles and the aluminum nitride particles. When a content of the thermally conductive filler is less than 80 volume %, filler particles do not sufficiently come into contact with each other in the matrix in the obtained composite material, and a tightly-adhered interface between the boron nitride particles and the aluminum nitride particles is not sufficiently formed. As a result, it is not possible to improve thermal conductivity due to a synergistic effect between the boron nitride particles and the aluminum nitride particles. On the other hand, when a content of the thermally conductive filler exceeds 95 volume %, the obtained composite material becomes fragile and a self-supporting composite material is not obtained. In addition, in consideration of the fact that thermal conductivity thereby tends to be further improved due to a synergistic effect between the boron nitride particles and the aluminum nitride particles, a content of the thermally conductive filler is more preferably 85 volume % to 95 volume % with respect to a total amount of the composite material.

Further, in the thermally conductive composite material according to the embodiment of the present disclosure, it is necessary for the porosity to be 10 volume % or less. In this manner, in the thermally conductive composite material according to the embodiment of the present disclosure, as described above, when the porosity is reduced to a low level of 10 volume % or less regardless of a very high filler filling ratio that would not be conceivable in a general filler-containing composite material, a sufficiently tightly-adhered interface is formed between the aluminum nitride particles and the boron nitride particles and between the boron nitride particles. According to a low thermal resistance at these interfaces and high thermal conductivity that the aluminum nitride particles initially have, as a result, the thermal conductivity can be improved according to a synergistic effect between the boron nitride particles and the aluminum nitride particles. When the porosity exceeds 10 volume %, filler particles do not sufficiently come into contact with each other in the matrix in the obtained composite material, and a tightly-adhered interface between the boron nitride particles and the aluminum nitride particles is not sufficiently formed. As a result, it is not possible to improve thermal conductivity due to a synergistic effect between the boron nitride particles and the aluminum nitride particles Here, the "porosity" in this specification means a value obtained by the following Formula (1).

$$\text{porosity [volume \%]} = \{1 - (\rho_{meas}/\rho_{calc})\} \times 100 \quad (1)$$

In Formula (1), $\rho_{meas}$ denotes an actual measurement value of a density of a composite material measured by the Archimedes method, and $\rho_{calc}$ denotes a calculated value (a theoretical value of a density of a composite material assuming that there are no voids) of a density of a composite material obtained by the following Formula (2).

$$\rho_{calc} = \{\rho_{BN} \times x + \rho_{AlN} \times (1-x)\} y + \rho_{matrix} \times (1-y) \quad (2)$$

In Formula (2), $\rho_{BN}$ denotes a density of BN ($\rho_{BN}$=2.27 in examples and comparative examples), $\rho_{AlN}$ denotes a density of AlN ($\rho_{AlN}$=3.26 in examples and comparative examples), $\rho_{matrix}$ denotes a density of a matrix ($\rho_{matrix}$=1.16 in examples and comparative examples), x denotes a volume fraction of BN in a filler, and y denotes a volume fraction of filler in a composite material.

A method of producing the thermally conductive composite material according to the embodiment of the present disclosure described above is not particularly limited. As will be described below, for example, when the boron nitride particles and the aluminum nitride particles are dispersed in the matrix as a thermally conductive filler, it is possible to obtain the thermally conductive composite material according to the embodiment of the present disclosure.

That is, first, the thermally conductive filler (the boron nitride particles and the aluminum nitride particles) and the matrix are mixed. In this case, the mixing ratio between the boron nitride particles, the aluminum nitride particles, and the matrix is determined so that contents of the boron nitride particles and the aluminum nitride particles in the obtained composite material become desired contents. In addition, a method of mixing thermally conductive filler and a matrix is not particularly limited, and a known mixing method is appropriately used.

In addition, if a resin is used as such a matrix, when the thermally conductive filler and the resin are mixed to prepare a homogeneous mixture and the obtained mixture is molded, it is possible to obtain the thermally conductive composite material. In this manner, when a thermally conductive filler and a resin are mixed to prepare a homogeneous mixture, a dispersion medium may be additionally added to prepare a uniform slurry. In this case, molding is preferably performed after the dispersion medium is removed by a known method such as vacuum drying.

Such a dispersion medium is not particularly limited, and for example, organic solvents such as N-methyl-2-pyrrolidone, chloroform, dichloromethane, carbon tetrachloride, acetone, methyl ethyl ketone, methyl isobutyl ketone, diisobutyl ketone, methyl acetate, ethyl acetate, propyl acetate, isopropyl acetate, butyl acetate, isobutyl acetate, pentyl acetate, isopentyl acetate, amyl acetate, tetrahydrofuran, dimethylformaldehyde, dimethylacetamide, dimethyl sulfoxide, acetonitrile, methanol, ethanol, propanol, isopropanol, butanol, hexanol, octanol, hexafluoroisopropanol, ethylene glycol, propylene glycol, tetramethylene glycol, tetraethylene glycol, hexamethylene glycol, diethylene glycol, benzene, toluene, xylene, chlorobenzene, dichlorobenzene, trichlorobenzene, chlorophenol, phenol, tetrahydrofuran, sulfolane, 1,3-dimethyl-2-imidazolidinone, γ-butyrolactone, N-dimethylpyrrolidone, pentane, hexane, neopentane, cyclohexane, heptane, octane, isooctane, nonane, decane, and diethylether may be exemplified.

In addition, preferably, the mixture is pressurized and compressed during molding. Such a compression method is not particularly limited, and uniaxial compression or biaxial compression may be used. In addition, the mixture may be isotropically compressed with a hydrostatic pressure. In addition, a pressure during compression is not particularly limited, and 5 MPa to 20 MPa is preferable. When a pressure during compression is less than this lower limit, voids tend to remain in the obtained composite material. On the other hand, when a pressure during compression exceeds this upper limit, it is difficult to control an arrangement of filler in the obtained composite material and a residual strain tends to occur.

Further, a method of solidifying a resin when the mixture is molded is not particularly limited, and a known method, for example, when a thermoplastic resin is used as a resin, a method by cooling such as radiation cooling can be used, and when various (heat, light, water) curable resins are used, suitable curing methods can be used. In addition, such solidification may be performed either during molding or after molding.

While the present disclosure will be described below in detail with reference to examples and comparative examples, the present disclosure is not limited to the following examples.

Examples 1 to 2 and Comparative Examples 1 to 5

"Denka's boron nitride powder SGP" (commercially available from Denka Company Limited, average particle size: 18 μm) was used as boron nitride particles (plate-shaped hexagonal boron nitride particles), "highly thermally conductive AlN filler FAN-f05" (commercially available from Furukawa Denshi Co., Ltd., average particle size: 7 μm) was used as aluminum nitride particles, and a one-part thermosetting type epoxy resin "epoxy resin EP160" (commercially available from Cemedine Co., Ltd.) was used as a matrix. Using this thermally conductive filler and matrix, composite materials were obtained as follows. That is, first, a dichloromethane solution of the epoxy resin (concentration: 6.0 volume %) and the boron nitride particles and the aluminum nitride particles (in Comparative Example 1, only the boron nitride particles, and in Comparative Example 5, only the aluminum nitride particles) were mixed so that contents of boron nitride particles and aluminum nitride particles in the obtained composite material and a content (filler filling ratio) of a thermally conductive filler were contents shown in Table 1, dichloromethane was volatilized while the obtained slurry was stirred, and dichloromethane was then completely removed by vacuum drying for about 15 minutes, and a mixture in which the boron nitride particles and the aluminum nitride particles are dispersed in the epoxy resin was obtained. Next, the obtained mixture was filled into a cylindrical container (inner diameter: 14 mmφ) preheated to 110° C. so that the thickness after molding was 35 mm, and left at 110° C. for 30 minutes while compression was performed at a pressure of 7.5 MPa in a longitudinal direction of the cylindrical container, and the epoxy resin was cured to obtain a columnar thermally conductive composite material.

<Measurement of Thermal Conductivity>

Figure 1:
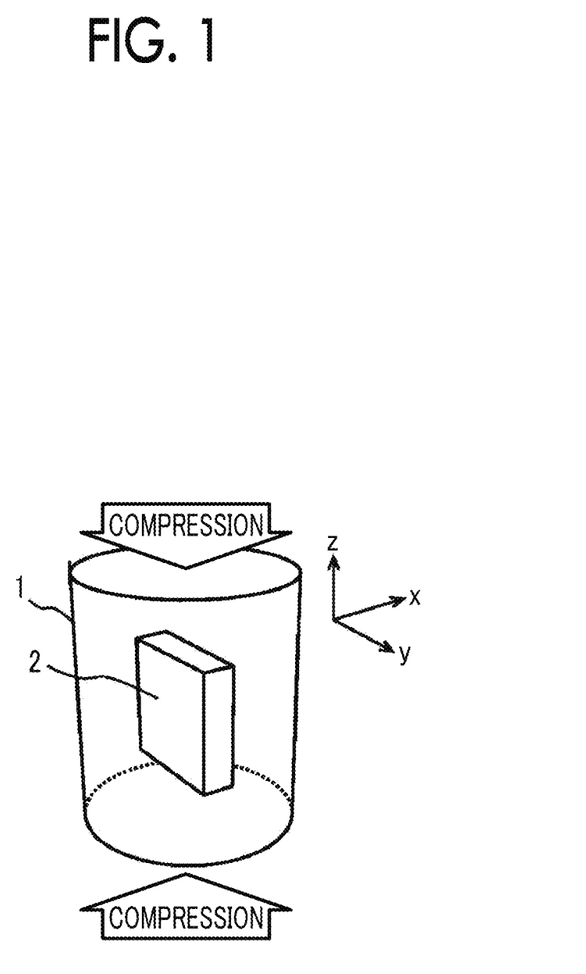
FIG. 1 is a schematic diagram showing a columnar composite material prepared in examples and comparative examples and a sample for measurement of thermal conductivity (x axis direction) cut therefrom.

As shown in FIG. 1, a sample 2 for thermal conductivity measurement (x axis direction length: 3 mm, y axis direction length: 10 mm, z axis direction length: 10 mm) was cut out from a columnar composite material 1. A thickness direction (x axis direction) of the sample was set as a heat flow direction, and thermal diffusivity in a direction (x axis direction) perpendicular to a compression direction was measured using a xenon flash analyzer ("LFA 447 NanoFlash" commercially available from NETZSCH). In addition, similarly, a sample for thermal conductivity measurement (z axis direction thickness: 3 mm, diameter: 14 mmφ, not shown) was cut out from the columnar composite material 1, a thickness direction (z axis direction) of the sample was set as a heat flow direction, and thermal diffusivity in a direction (z axis direction) parallel to the compression direction was measured using a xenon flash analyzer ("LFA 447 NanoFlash" commercially available from NETZSCH).

In addition, a specific heat of the sample was measured by a DSC method using a heat vibration type differential scanning calorimeter (commercially available from TA Instruments). Further, a density of the sample was obtained by collecting a gas over water (Archimedes method). From the results, thermal conductivities in a direction (x axis direction) perpendicular to the compression direction and in a direction (z axis direction) parallel to the compression direction were obtained according to the following formula:

thermal conductivity (W/(m·K))=specific heat (J/(kg·K))×density (kg/m$^3$)×thermal diffusivity (m$^2$/sec)

Figure 2:
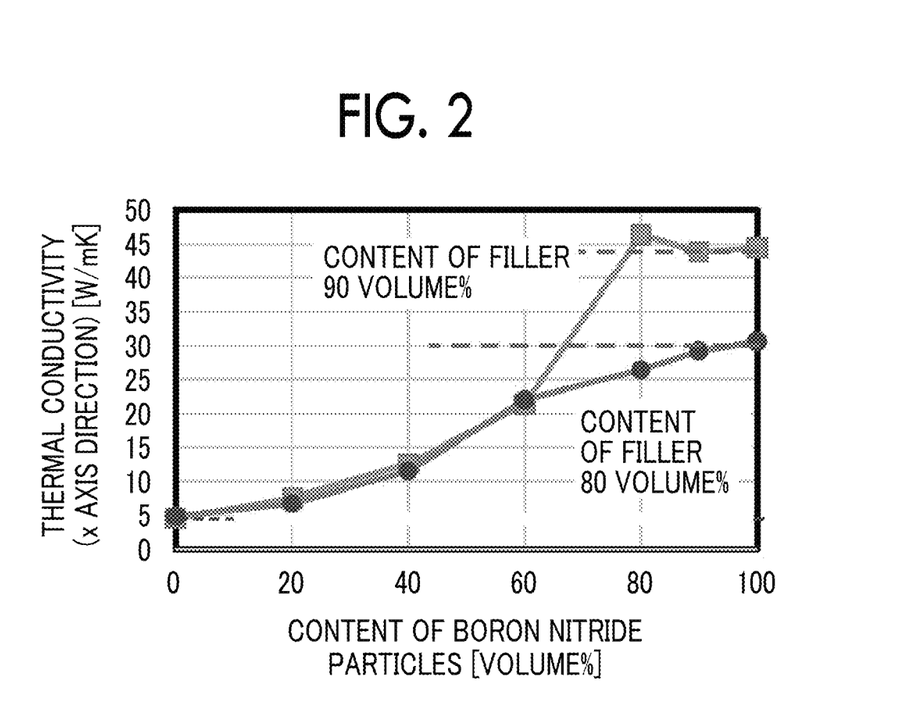
FIG. 2 is a graph showing a relationship between a content of boron nitride particles in composite materials obtained in Examples 1 to 5 and Comparative Examples 1 to 9 and thermal conductivity in an x axis direction.
Figure 3:
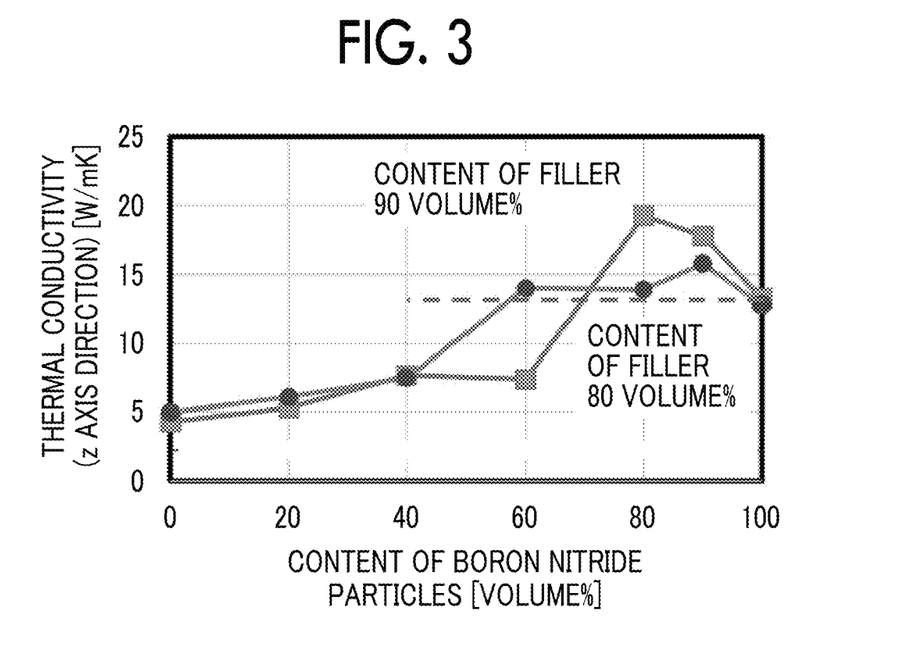
FIG. 3 is a graph showing a relationship between a content of boron nitride particles in composite materials obtained in Examples 1 to 5 and Comparative Examples 1 to 9 and thermal conductivity in a z axis direction.

The obtained results are shown in Table 1, FIG. 2 and FIG. 3.

<Porosity Measurement>

From an actual measurement value (ρmeas) of a density of the composite material obtained by collecting a gas over water (Archimedes method) and a calculated value (a theoretical value of a density of a composite material assuming that there were no voids: ρcalc) of a density of the composite material obtained by Formula (2) in the measurement of thermal conductivity, porosities of the composite materials were obtained by Formula (1). The obtained results are shown in Table 1 and FIG. 4.

<Electron Microscopic Observation of Cross Section>

Figure 5:
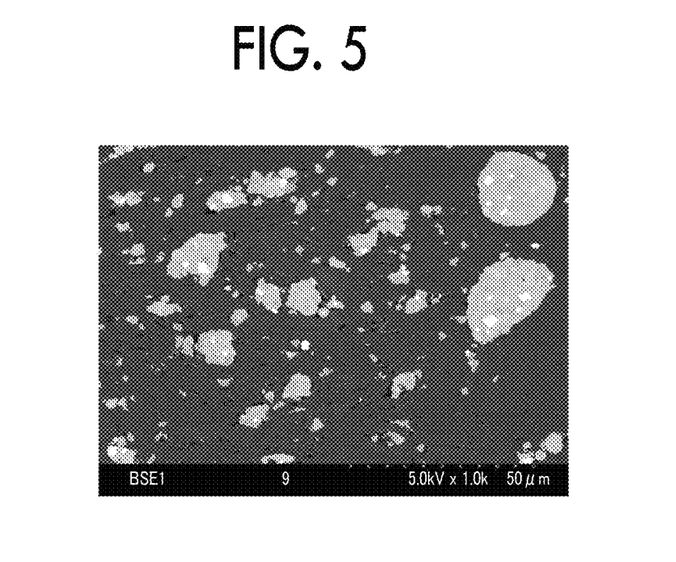
FIG. 5 is a scanning electron microscope picture showing an SEM image of a cross section of a composite material obtained in Example 2.
Figure 6:
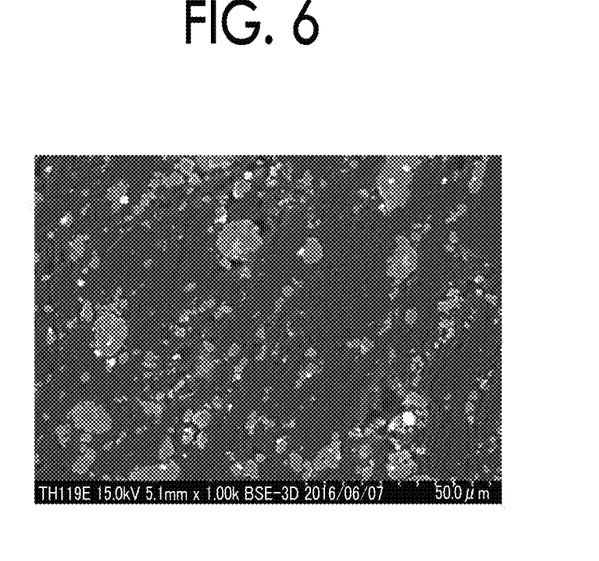
FIG. 6 is a scanning electron microscope picture showing an SEM image of a cross section of a composite material obtained in Comparative Example 2.

Samples for electron microscopic observation of a cross section were cut out from the columnar composite materials obtained in Example 2 and Comparative Example 2. Mechanical polishing was performed on an arbitrary area with a length of 60 microns and a height of 40 microns using a polishing machine ("Minimet TM1000" commercially available from Buhler) using a diamond paste and an alumina paste as abrasives, and oxygen plasma etching ("Plasma reactor PR 300" commercially available from Yamato Scientific Co., Ltd.) was then performed at 12 W for 3 minutes. Osmium coating was performed using an osmium coater and electron microscopic observation of a cross section was performed using a scanning electronic microscope ("NB-5000" commercially available from Hitachi High-Technologies Corporation). Scanning electron microscope pictures (SEM images) of the composite materials obtained in Example 2 and Comparative Example 2 are shown in FIG. 5 and FIG. 6.

TABLE 1

| | Thermally conductive filler | | | | | | | Thermal conductivity | |
| | Boron nitride particles | | Aluminum nitride particles | | | Content of thermally | | | |
| | Average particle size [μm] | Content (*1) [volume %] | Average particle size [μm] | Content (*1) volume % | Matrix | conductive filler (*2) [volume %] | Porosity [volume %] | (x axis direction) [W/mK] | (z axis direction) [W/mK] |
|---|---|---|---|---|---|---|---|---|---|
| Comparative Example 1 | 18 | 100 | — | 0 | Epoxy resin | 90 | 8.2 | 44.0 | 13.3 |
| Example 1 | 18 | 90 | 7 | 10 | Epoxy resin | 90 | 6.8 | 43.8 | 17.8 |
| Example 2 | 18 | 80 | 7 | 20 | Epoxy resin | 90 | 7.4 | 46.3 | 19.3 |
| Comparative Example 2 | 18 | 60 | 7 | 40 | Epoxy resin | 90 | 14.3 | 21.3 | 7.4 |
| Comparative Example 3 | 18 | 40 | 7 | 60 | Epoxy resin | 90 | 23.7 | 12.6 | 7.7 |

TABLE 1-continued

| | Thermally conductive filler | | | | | | | | |
|---|---|---|---|---|---|---|---|---|---|
| | Boron nitride particles | | Aluminum nitride particles | | | Content of thermally | | Thermal conductivity | |
| | Average particle size [μm] | Content (*1) [volume %] | Average particle size [μm] | Content (*1) volume %] | Matrix | conductive filler (*2) [volume %] | Porosity [volume %] | (x axis direction) [W/mK] | (z axis direction) [W/mK] |
| Comparative Example 4 | 18 | 20 | 7 | 80 | Epoxy resin | 90 | 24.2 | 7.6 | 5.3 |
| Comparative Example 5 | — | 0 | 7 | 100 | Epoxy resin | 90 | 27.6 | 4.5 | 4.3 |

(*1): content with respect to a total amount of a thermally conductive filler [volume %]
(*2): content of a thermally conductive filler with respect to a total amount of the composite material [volume %]

Examples 3 to 5 and Comparative Examples 6 to 9

As shown in Table 2, except that a content of a thermally conductive filler in the obtained composite material was 80 volume %, in Example 3, a thermally conductive composite material was obtained in the same manner as in Example 1, in Example 4, a thermally conductive composite material was obtained in the same manner as in Example 2, in Example 5, a thermally conductive composite material was obtained in the same manner as in Comparative Example 2, in Comparative Example 6, a thermally conductive composite material was obtained in the same manner as in Comparative Example 1, in Comparative Example 8, a thermally conductive composite material was obtained in the same manner as in Comparative Example 4, and in Comparative Example 9, a thermally conductive composite material was obtained in the same manner as in Comparative Example 5.

Figure 7:
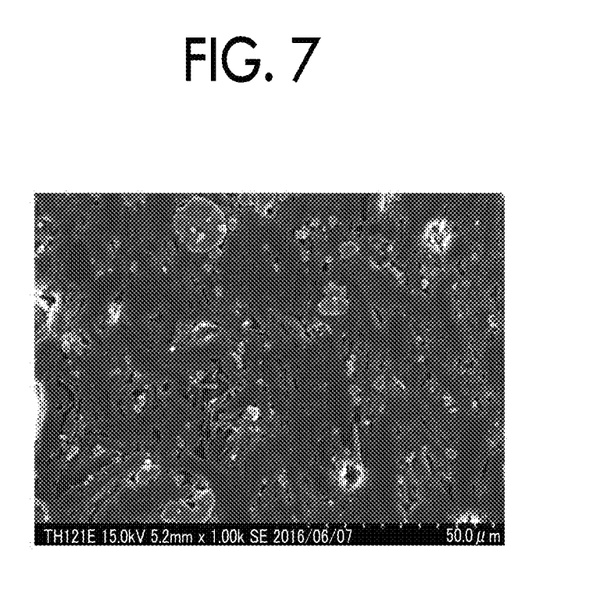
FIG. 7 is a scanning electron microscope picture showing an SEM image of a cross section of a composite material obtained in Example 4.

Then, thermal conductivity of the obtained composite material was measured in the same manner as in Example 2, and thermal conductivities in a direction (x axis direction) perpendicular to the compression direction and in a direction (z axis direction) parallel to the compression direction were obtained. The obtained results are shown in Table 2, FIG. 2 and FIG. 3. In addition, the porosity of the obtained composite material was obtained in the same manner as in Example 2, and the obtained results are shown in Table 2 and FIG. 4. Further, an electron microscopic observation of a cross section was performed on the columnar composite material obtained in Example 4 in the same manner as in Example 2, and the obtained scanning electron microscope picture (SEM image) is shown in FIG. 7.

TABLE 2

| | Thermally conductive filler | | | | | | | | |
|---|---|---|---|---|---|---|---|---|---|
| | Boron nitride particles | | Aluminum nitride particles | | | Content of thermally | | Thermal conductivity | |
| | Average particle size [μm] | Content (*1) [volume %] | Average particle size [μm] | Content (*1) volume %] | Matrix | conductive filler (*2) [volume %] | Porosity [volume %] | (x axis direction) [W/mK] | (z axis direction) [W/mK] |
| Comparative Example 6 | 18 | 100 | — | 0 | Epoxy resin | 80 | 6.9 | 30.0 | 12.8 |
| Example 3 | 18 | 90 | 7 | 10 | Epoxy resin | 80 | 6.5 | 29.5 | 15.8 |
| Example 4 | 18 | 80 | 7 | 20 | Epoxy resin | 80 | 6.9 | 26.4 | 13.9 |
| Example 5 | 18 | 60 | 7 | 40 | Epoxy resin | 80 | 7.6 | 22.0 | 14.0 |
| Comparative Example 7 | 18 | 40 | 7 | 60 | Epoxy resin | 80 | 13.1 | 11.5 | 7.5 |
| Comparative Example 8 | 18 | 20 | 7 | 80 | Epoxy resin | 80 | 18.1 | 6.7 | 6.1 |
| Comparative Example 9 | — | 0 | 7 | 100 | Epoxy resin | 80 | 16.8 | 4.9 | 5.0 |

(*1): content with respect to a total amount of a thermally conductive filler [volume %]
(*2): content of a thermally conductive filler with respect to a total amount of the composite material [volume %]

Comparative Examples 10 to 15

As shown in Table 3, except that "aluminum nitride (AlN) powder AlN100AF" (commercially available from TOMOE Engineering Co., Ltd., average particle size: 10 μm) was used as aluminum nitride particles and moreover, a content of a thermally conductive filler in the obtained composite material was 40 volume %, in Comparative Example 10, a thermally conductive composite material was obtained in the same manner as in Comparative Example 1, in Comparative Example 11, a thermally conductive composite material was obtained in the same manner as in Example 2, in Comparative Example 12, a thermally conductive composite material was obtained in the same manner as in Comparative Example 2, in Comparative Example 13, a thermally conductive composite material was obtained in the same manner as in Comparative Example 3, in Comparative Example 14, a thermally conductive composite material was obtained in the same manner as in Comparative Example 4, and in Comparative Example 15, a thermally conductive composite material was obtained in the same manner as in Comparative Example 5.

Then, thermal conductivities of the obtained composite materials were measured in the same manner as in Example 2, and thermal conductivities in a direction (x axis direction) perpendicular to the compression direction and in a direction (z axis direction) parallel to the compression direction were obtained. The obtained results are shown in Table 3 and FIG. 8. In addition, the porosity of the obtained composite material was obtained in the same manner as in Example 2, and the obtained results are shown in Table 3. Further, electron microscopic observation of a cross section was performed on the columnar composite material obtained in Comparative Example 11 in the same manner as in Example 2, and the obtained scanning electron microscope picture (SEM image) is shown in FIG. 9.

Comparative Example 17

As shown in Table 4, a thermally conductive composite material was obtained in the same manner as in Example 2 except that a content of the thermally conductive filler in the obtained composite material was 70 volume %.

Then, thermal conductivity of the obtained composite material was measured in the same manner as in Example 2, and thermal conductivity in a direction (x axis direction) perpendicular to the compression direction was obtained. The obtained results are shown in Table 4. In addition, the porosity of the obtained composite material was obtained in the same manner as in Example 2, and the obtained results are shown in Table 4.

Comparative Example 18

As shown in Table 4, a thermally conductive composite material was obtained in the same manner as in Example 2

TABLE 3

| | Thermally conductive filler | | | | | | | |
|---|---|---|---|---|---|---|---|---|
| | Boron nitride particles | | Aluminum nitride particles | | | Content of thermally | | Thermal conductivity | |
| | Average particle size [μm] | Content (*1) [volume %] | Average particle size [μm] | Content (*1) volume %] | Matrix | conductive filler (*2) [volume %] | Porosity [volume %] | (x axis direction) [W/mK] | (z axis direction) [W/mK] |
| Comparative Example 10 | 18 | 100 | — | 0 | Epoxy resin | 40 | 0 | 4.1 | 3.0 |
| Comparative Example 11 | 18 | 80 | 10 | 20 | Epoxy resin | 40 | 0 | 3.3 | 2.4 |
| Comparative Example 12 | 18 | 60 | 10 | 40 | Epoxy resin | 40 | 0 | 2.7 | 2.2 |
| Comparative Example 13 | 18 | 40 | 10 | 60 | Epoxy resin | 40 | 0 | 2.2 | 1.9 |
| Comparative Example 14 | 18 | 20 | 10 | 80 | Epoxy resin | 40 | 0 | 1.9 | 1.8 |
| Comparative Example 15 | — | 0 | 10 | 100 | Epoxy resin | 40 | 0 | 1.4 | 1.3 |

(*1): content with respect to a total amount of a thermally conductive filler [volume %]

(*2): content of a thermally conductive filler with respect to a total amount of the composite material [volume %]

Comparative Example 16

As shown in Table 4, a thermally conductive composite material was obtained in the same manner as in Example 2 except that "aluminum nitride (AlN) powder AlN300AF" (commercially available from TOMOE Engineering Co., Ltd., average particle size: 30 μm) was used as aluminum nitride particles.

Then, thermal conductivity of the obtained composite material was measured in the same manner as in Example 2, and thermal conductivity in a direction (x axis direction) perpendicular the compression direction was obtained. The obtained results are shown in Table 4. In addition, the porosity of the obtained composite material was obtained in the same manner as in Example 2, and the obtained results are shown in Table 4.

except that diamond particles ("nanoDiamond DPC4-6" commercially available from Vision Development Co., Ltd., average particle size: 5 μm) were used in place of aluminum nitride particles.

Then, thermal conductivity of the obtained composite material was measured in the same manner as in Example 2, and thermal conductivity in a direction (x axis direction) perpendicular to the compression direction was obtained. The obtained results are shown in Table 4. In addition, the porosity of the obtained composite material was obtained in the same manner as in Example 2, and the obtained results are shown in Table 4.

TABLE 4

| | Thermally conductive filler | | | | | | | |
| | Boron nitride particles | | Aluminum nitride particles | | | | | |
| | Average particle size [μm] | Content (*1) [volume %] | Average particle size [μm] | Content (*1) volume %] | Matrix | Content of thermally conductive filler (*2) [volume %] | Porosity [volume %] | Thermal conductivity (x axis direction) [W/mK] |
|---|---|---|---|---|---|---|---|---|
| Example 2 | 18 | 80 | 7 | 20 | Epoxy resin | 90 | 7.4 | 46.3 |
| Comparative Example 11 | 18 | 80 | 10 | 20 | Epoxy resin | 40 | 0 | 3.3 |
| Comparative Example 16 | 18 | 80 | 30 | 20 | Epoxy resin | 90 | 12.1 | 33.0 |
| Comparative Example 17 | 18 | 80 | 7 | 20 | Epoxy resin | 70 | 1.7 | 18.6 |

| | Thermally conductive filler | | | | | | | |
| | Boron nitride particles | | Diamond particles | | | | | |
| | Average particle size [μm] | Content (*1) [volume %] | Average particle size [μm] | Content (*1) volume %] | Matrix | Content of thermally conductive filler (*2) [volume %] | Porosity [volume %] | Thermal conductivity (x axis direction) [W/mK] |
|---|---|---|---|---|---|---|---|---|
| Comparative Example 18 | 18 | 80 | 5 | 20 | Epoxy resin | 90 | 15.5 | 30.0 |

(*1): content with respect to a total amount of a thermally conductive filler [volume %]
(*2): content of a thermally conductive filler with respect to a total amount of the composite material [volume %]

Figure 4:
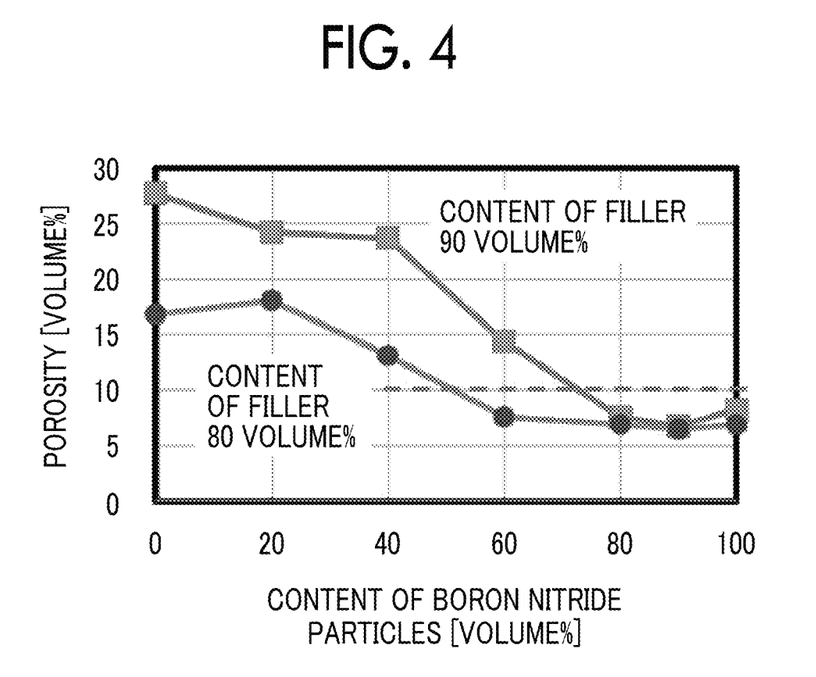
FIG. 4 is a graph showing a relationship between a content of boron nitride particles in composite materials obtained in Examples 1 to 5 and Comparative Examples 1 to 9 and a porosity.

As can be clearly understood from the results shown in Tables 1 and 2 and FIGS. 2 to 4, in the composite materials obtained in Examples 1 to 5 in which the boron nitride particles and the aluminum nitride particles with average particle sizes defined in the present disclosure were used as the thermally conductive filler, and the mixing ratio of them, the filler filling ratio, and the porosity satisfied requirements defined in the present disclosure, it was confirmed that, in at least one of the thermal conductivities in a direction (x axis direction) perpendicular to the compression direction and in a direction (z axis direction) parallel to the compression direction, higher thermal conductivity was obtained due to a synergistic effect between the boron nitride particles and the aluminum nitride particles compared to when these were used alone.

In addition, in the composite materials obtained in Example 2 and Example 4 in which requirements of the present disclosure were satisfied, as shown in FIG. 5 and FIG. 7, it was confirmed that a structure with a low thermal resistance was formed in close contact between the boron nitride particles and the aluminum nitride particles.

On the other hand, as can be clearly understood from the results shown in Tables 1 to 2 and FIGS. 2 to 4, in the composite materials obtained in Comparative Examples 1 to 9 in which requirements of the present disclosure did not satisfy, it was confirmed that, in both of the thermal conductivities in a direction (x axis direction) perpendicular to the compression direction and in a direction (z axis direction) parallel to the compression direction, thermal conductivity was lower compared to when the boron nitride particles were used alone, and a synergistic effect between the boron nitride particles and the aluminum nitride particles was not obtained.

In addition, in the composite material obtained in Comparative Example 2 in which requirements of the present disclosure did not satisfy, as shown in FIG. 6, it was confirmed that voids were formed between the boron nitride particles and the aluminum nitride particles, and an interface at that part was in a high thermal resistance state.

Figure 8:
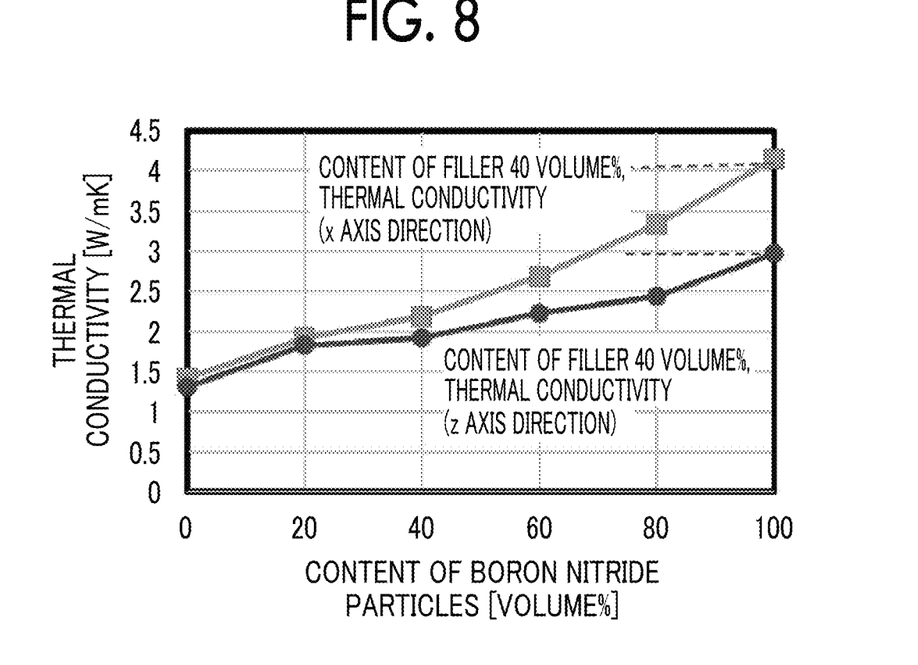
FIG. 8 is a graph showing a relationship between a content of boron nitride particles in composite materials obtained in Comparative Examples 10 to 15 and thermal conductivities in an x axis direction and a z axis direction.
Figure 9:
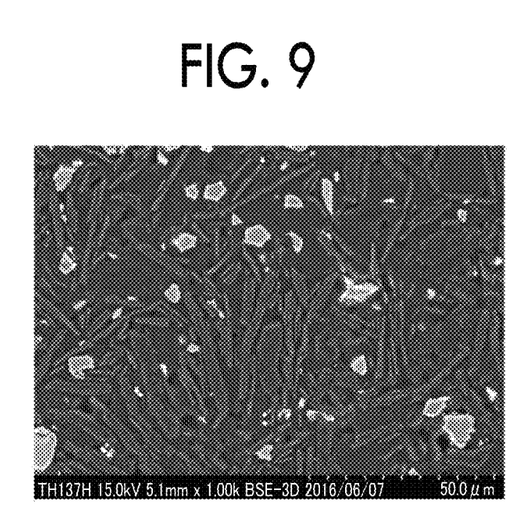
FIG. 9 is a scanning electron microscope picture showing an SEM image of a cross section of a composite material obtained in Comparative Example 11.

Further, as can be clearly understood from the results shown in Table 3 and FIG. 8, in the composite materials obtained in Comparative Examples 10 to 15 in which the filler filling ratio was 40 volume % and requirements of the present disclosure did not satisfy, it was confirmed that, in both of the thermal conductivities in a direction (x axis direction) perpendicular to the compression direction and in a direction (z axis direction) parallel to the compression direction, thermal conductivity was lower compared to when the boron nitride particles were used alone, and a synergistic effect between the boron nitride particles and the aluminum nitride particles was not obtained.

In addition, in the composite material obtained in not Comparative Example 11 in which requirements of the present disclosure did not satisfy, as shown in FIG. 9, it was confirmed that filler particles did not come in close contact with each other and were dispersed in a sparse state, and thus an interfacial thermal resistance was high, and a state in which thermal conductivity was higher than that of a single filler was not brought into.

Further, as can be clearly understood from the results shown in Table 4, in all of Comparative Example 16 in which the average particle size of the aluminum nitride particles did not satisfy requirements of the present disclosure, Comparative Example 17 in which the filler filling ratio was 70 volume % and requirements of the present disclosure did not satisfy, and Comparative Example 18 in which diamond particles were used in place of aluminum nitride particles, it was confirmed that thermal conductivity in a direction (x axis direction) perpendicular to the compression direction was lower than that of the composite material (Example 2) of the present disclosure, and a synergistic effect between the boron nitride particles and the aluminum nitride particles was not obtained.

As described above, according to the present disclosure, it is possible to provide a thermally conductive composite material having excellent thermal conductivity. Therefore, since the composite material of the present disclosure has excellent thermal conductivity, it is beneficial for, for example, a heat dissipation material for an automobile and a heater material.

What is claimed is:

1. A thermally conductive composite material comprising:
a matrix; and
a thermally conductive filler that is dispersed in the matrix,
wherein the thermally conductive filler is a mixture including boron nitride particles with an average particle size of 10 μm to 100 μm and aluminum nitride particles with an average particle size that is 1/100 to 1/2 of the average particle size of the boron nitride particles,
wherein a content of the boron nitride particles is 80 volume % to 90 volume % with respect to a total amount of the boron nitride particles and the aluminum nitride particles,
wherein a content of the thermally conductive filler is 80 volume % to 95 volume % with respect to a total amount of the composite material, and
wherein a porosity of the composite material is 10 volume % or less.

2. The thermally conductive composite material according to claim 1,
wherein the content of the thermally conductive filler is 85 volume % to 95 volume % with respect to the total amount of the composite material.

3. The thermally conductive composite material according to claim 1, wherein the boron nitride particles are plate-shaped hexagonal boron nitride particles.

4. The thermally conductive composite material according to claim 1, wherein an average particle size of the boron nitride particles is 10 μm to 50 μm, and an average particle size of the aluminum nitride particles is 1/30 to 1/2 of the average particle size of the boron nitride particles.

5. The thermally conductive composite material according to claim 1, wherein the matrix is at least one of a group consisting of an epoxy resin, a phenolic resin, a silicone resin, polystyrene, polymethyl methacrylate, polycarbonate, a polyolefin, a polyolefin elastomer, polyethylene terephthalate, nylon, an ABS resin, polyamide, polyimide, polyamide imide, ethylene-propylene-diene rubber, butyl rubber, natural rubber, polyisoprene, and polyetherimide.

6. A thermally conductive composite material comprising:
a matrix; and
a thermally conductive filler that is dispersed in the matrix,
wherein the thermally conductive filler is a mixture including boron nitride particles with an average particle size of 10 μm to 100 μm and aluminum nitride particles with an average particle size that is 1/100 to 1/2 of the average particle size of the boron nitride particles,
wherein a content of the boron nitride particles is 60 volume % to 90 volume % with respect to a total amount of the boron nitride particles and the aluminum nitride particles,
wherein a content of the thermally conductive filler is 80 volume % to 95 volume % with respect to a total amount of the composite material, and
wherein a porosity of the composite material is 6.5 volume % or more and 10 volume % or less.

* * * * *